United States Patent
Koide et al.

(10) Patent No.: US 11,053,343 B2
(45) Date of Patent: Jul. 6, 2021

(54) THERMOPLASTIC POLYURETHANE RESIN COMPOSITION AND MOLDED BODY USING SAID RESIN COMPOSITION

(71) Applicant: TOSOH CORPORATION, Shunan (JP)

(72) Inventors: Kazuhiro Koide, Yokohama (JP); Hiroei Yokota, Yokohama (JP)

(73) Assignee: TOSOH CORPORATION, Shunan (JP)

(*) Notice: Subject to any disclaimer, the term of this patent is extended or adjusted under 35 U.S.C. 154(b) by 189 days.

(21) Appl. No.: 16/488,923

(22) PCT Filed: Feb. 20, 2018

(86) PCT No.: PCT/JP2018/005841
§ 371 (c)(1),
(2) Date: Aug. 26, 2019

(87) PCT Pub. No.: WO2018/155396
PCT Pub. Date: Aug. 30, 2018

(65) Prior Publication Data
US 2020/0002461 A1 Jan. 2, 2020

(30) Foreign Application Priority Data

Feb. 27, 2017 (JP) .............................. JP2017-034694
Jan. 31, 2018 (JP) .............................. JP2018-014969

(51) Int. Cl.
| | |
|---|---|
| C08G 18/66 | (2006.01) |
| C08G 18/32 | (2006.01) |
| C08G 18/44 | (2006.01) |
| C08G 18/73 | (2006.01) |
| C08J 5/18 | (2006.01) |
| C08K 5/3492 | (2006.01) |

(52) U.S. Cl.
CPC ....... *C08G 18/664* (2013.01); *C08G 18/3206* (2013.01); *C08G 18/44* (2013.01); *C08G 18/73* (2013.01); *C08J 5/18* (2013.01); *C08K 5/3492* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 3,721,645 A | 3/1973 | Zemlin | |
| 6,867,250 B1* | 3/2005 | Gupta | C08K 5/3492 524/100 |
| 8,585,782 B2* | 11/2013 | Wagner | A61P 17/00 8/566 |
| 2006/0052491 A1* | 3/2006 | Braig | A61K 8/4966 524/99 |
| 2008/0146766 A1* | 6/2008 | Masubuchi | C08G 18/664 528/67 |
| 2013/0131233 A1* | 5/2013 | Fukatani | B32B 17/10036 524/91 |

FOREIGN PATENT DOCUMENTS

| | | |
|---|---|---|
| CN | 1277621 A | 12/2000 |
| CN | 102803383 A | 11/2012 |
| CN | 106008902 A | 10/2016 |
| EP | 1010712 A1 | 6/2000 |
| JP | S63-199261 A | 8/1988 |
| JP | H06-93217 A | 4/1994 |
| JP | 2000-319347 A | 11/2000 |
| JP | 2001-205658 A | 7/2001 |
| JP | 2001-262122 A | 9/2001 |
| JP | 2002-513832 A | 5/2002 |
| JP | 2003-525966 A | 9/2003 |
| JP | 2009-299034 A | 12/2009 |
| JP | 2010-265170 A | 11/2010 |
| JP | 2015-101600 A | 6/2015 |
| JP | 2016-084463 A | 5/2016 |
| WO | WO 99/057189 A1 | 11/1999 |
| WO | WO 00/055231 A1 | 9/2000 |
| WO | WO 2007/114042 A1 | 10/2007 |

(Continued)

OTHER PUBLICATIONS

International Search Report dated Apr. 17, 2018, in International Patent Application No. PCT/JP2018/005841, 2 pages.
International Preliminary Report on Patentability dated Aug. 27, 2019, in International Patent Application No. PCT/JP2018/005841, 6 pages.
An Fang, "Synthesis of 2, 4- di(3', 5'-dimethylphenyl)- 6-(2'-hydroxyl-4'-hexyloxylphenyl) phenyl-1, 3, 5 Triazine", Shanxi Provincial Institute of Chemical Industry, Taiyuan, 030021, vol. 2, May 28, 2007.
Supplementary European Search Report for European Patent Application No. 18757434.8, 5 pages, extended Supplementary Search Report dated Dec. 14, 2020.

*Primary Examiner* — Satya B Sastri
(74) *Attorney, Agent, or Firm* — Squire Patton Boggs (US) LLP

(57) ABSTRACT

Provided is a thermoplastic resin composition which has improved ultraviolet absorbing capability, mechanical characteristics, hydrolysis resistance, transparency, and blooming resistance and is used for protecting an article used outdoors from ultraviolet light. A problem is solved by a thermoplastic polyurethane resin composition which is a reaction product of an isocyanate component (A1) containing an aliphatic polyisocyanate, a chain extender (A2), and a polyol component (A3) containing a polycarbonate diol having a side-chain alkyl group and contains an ultraviolet absorber (B1) having a benzotriazole skeleton, an ultraviolet absorber (B2) having a maximum absorption wavelength in a range from greater than or equal to 250 nm to less than or equal to 290 nm and having a triazine skeleton, a hindered amine light stabilizer (C), and an antioxidant (D).

7 Claims, No Drawings

(56) References Cited

FOREIGN PATENT DOCUMENTS

| WO | WO 2009/139241 A1 | 11/2009 |
| WO | WO 2016/174969 A1 | 11/2016 |

* cited by examiner

THERMOPLASTIC POLYURETHANE RESIN COMPOSITION AND MOLDED BODY USING SAID RESIN COMPOSITION

TECHNICAL FIELD

The present invention relates to a thermoplastic polyurethane resin composition and a molded body using the same.

BACKGROUND ART

A thermoplastic polyurethane resin (hereinafter, referred to as TPU in some cases) is excellent in strength, flexibility, and abrasion resistance, and therefore it is used as a member protecting a surface of an article. In a case where an article to be protected is used, for example, in an environment in which the article is exposed to sunlight for a long time, a molded body, which is formed by a resin composition in which a light stabilizer is added to a TPU made from an aliphatic or alicyclic diisocyanate is used in order to suppress degradation in designability caused by yellowing with the passage of time of the TPU.

Patent Literature 1 discloses a coating composition containing 0.01 to 5% by weight of a mixture of an ultraviolet absorber containing at least one 2-hydroxyphenyl benzotriazole and at least one 2-hydroxyphenyl triazine at a molar ratio of 31 to 13. However, the coating composition according to Patent Literature 1 is not sufficient in weather resistance in the case of being used outdoors for a long period of time.

Patent Literature 2 discloses a molded article containing, from about 50 to about 5,000 ppm of at least one ortho-hydroxy tris-aryl triazine light absorber, and from about 500 ppm to about 1.25% of at least one oligomeric, polymeric, or high molecular weight hindered amine light stabilizer (HALS) having a molecular weight of at least 500, in which a weight ratio of HALS:triazine is from about 3:1 to about 20:1. However, in the molded article according to Patent Literature 2, it is not sufficient to prevent appearance deterioration due to yellowing of a resin molded article itself.

CITATION LIST

Patent Literature

Patent Literature 1: Japanese Unexamined Patent Publication No. H06-93217
Patent Literature 2: Japanese Unexamined Patent Publication No. 2002-513832

SUMMARY OF INVENTION

Technical Problem

An embodiment of the present invention is made in view of the above-described background art, and an object thereof is to provide a thermoplastic polyurethane resin composition having excellent ultraviolet absorbing capability, mechanical characteristics, hydrolysis resistance, transparency, and blooming resistance, and a molded body using the thermoplastic polyurethane resin composition.

Solution to Problem

The present inventors have conducted intensive studies to solve the above-described problems, and as a result, found that by a combination of a benzotriazole-based ultraviolet absorber, a triazine-based ultraviolet absorber having a maximum absorption wavelength in a range from greater than or equal to 250 nm to less than or equal to 290 nm, and a hindered amine light stabilizer, an influence of ultraviolet light having a wide wavelength range, particularly harmful UVB (280 nm, or more and 315 nm or less) can be efficiently decreased, and further, by optimizing a TPU structure in terms of mechanical characteristics, designability, and hydrolysis resistance, a thermoplastic polyurethane resin composition and a molded article using the same which can be provided to practical use have been completed.

That is, a thermoplastic polyurethane resin composition according to an embodiment of the present invention is a thermoplastic polyurethane resin composition containing:
a thermoplastic polyurethane resin (A);
an ultraviolet absorber (B);
a hindered amine light stabilizer (C); and
an antioxidant (D), in which
the thermoplastic polyurethane resin (A) is a reaction product of
an isocyanate component (A1) containing an aliphatic polyisocyanate, a chain extender (A2), and a polyol component (A3) containing a polycarbonate diol having a side-chain alkyl group,
the ultraviolet absorber (B) contains
an ultraviolet absorber (B1) having a benzotriazole skeleton, and an ultraviolet absorber (B2) having a triazine skeleton,
the ultraviolet absorber (B2) having a triazine skeleton has a maximum absorption wavelength in a range from greater than or equal to 250 nm to less than or equal to 290 nm,
a mass ratio (B1)/(B2) of the ultraviolet absorber (B1) having a benzotriazole skeleton to the ultraviolet absorber (B2) having a triazine skeleton is greater than or equal to 2.5/1 and less than or equal to 10/1,
the sum of a content of the ultraviolet absorber (B1) having a benzotriazole skeleton and a content of the ultraviolet absorber (B2) having a triazine skeleton is greater than or equal to 0.6 part by mass and less than or equal to 1.2 parts by mass with respect to 100 parts by mass of the thermoplastic polyurethane resin (A),
a content of the hindered amine light stabilizer (C) is greater than or equal to 0.2 part by mass and less than or equal to 2.0 parts by mass with respect to 100 parts by mass of the thermoplastic polyurethane resin (A), and
a content of the antioxidant (D) is greater than or equal to 0.05 part by mass and less than or equal to 1.0 part by mass with respect to 100 parts by mass of the thermoplastic polyurethane resin (A).

Further, a molded body according to another embodiment of the present invention is formed by the thermoplastic polyurethane resin composition.

Advantageous Effects of Invention

According to an embodiment of the present invention, it is possible to provide a thermoplastic polyurethane resin composition having excellent ultraviolet absorbing capability, mechanical characteristics, hydrolysis resistance, transparency, and blooming resistance. In addition, according to another embodiment of the present invention, it is possible to provide a molded body using the thermoplastic polyurethane resin composition.

DESCRIPTION OF EMBODIMENTS

Hereinafter, exemplary embodiments for carrying out the present invention will be described in detail.

[Thermoplastic Polyurethane Resin Composition]

A thermoplastic polyurethane resin composition according to an embodiment of the present invention is a thermoplastic polyurethane resin composition containing:

a thermoplastic polyurethane resin (A);
an ultraviolet absorber (B);
a hindered amine light stabilizer (C); and
an antioxidant (D), in which
the thermoplastic polyurethane resin (A) is a reaction product of
an isocyanate component (A1) containing an aliphatic polyisocyanate, a chain extender (A2), and a polyol component (A3) containing a polycarbonate diol having a side-chain alkyl group,
the ultraviolet absorber (B) contains
an ultraviolet absorber (B1) having a benzotriazole skeleton, and an ultraviolet absorber (B2) having a triazine skeleton,
the ultraviolet absorber (B2) having a triazine skeleton has a maximum absorption wavelength in a range from greater than or equal to 250 nm to less than or equal to 290 nm,
a mass ratio (B1)/(B2) of the ultraviolet absorber (B1) having a benzotriazole skeleton to the ultraviolet absorber (B2) having a triazine skeleton is greater than or equal to 2.5/1 and less than or equal to 10/1,
the sum of a content of the ultraviolet absorber (B1) having a benzotriazole skeleton and a content of the ultraviolet absorber (B2) having a triazine skeleton is greater than or equal to 0.6 part by mass and less than or equal to 1.2 parts by mass with respect to 100 parts by mass of the thermoplastic polyurethane resin (A),
a content of the hindered amine light stabilizer (C) is greater than or equal to 0.2 part by mass and less than or equal to 2.0 parts by mass with respect to 100 parts by mass of the thermoplastic polyurethane resin (A), and
a content of the antioxidant (D) is greater than or equal to 0.05 part by mass and less than or equal to 1.0 part by mass with respect to 100 parts by mass of the thermoplastic polyurethane resin (A).

The thermoplastic polyurethane resin composition according to an embodiment of the present invention contains a thermoplastic polyurethane resin (A), an ultraviolet absorber (B), a hindered amine light stabilizer (C), and an antioxidant (D). These respective components will be described sequentially.

<Thermoplastic Polyurethane Resin (A)>

The thermoplastic polyurethane resin (A) is a reaction product of an isocyanate component (A1) containing an aliphatic polyisocyanate, a chain extender (A2), and a polyol component (A3) containing a polycarbonate diol having a side-chain alkyl group.

<<Isocyanate Component (A1)>>

The isocyanate component (A1) contains an aliphatic polyisocyanate. Examples of the aliphatic polyisocyanate include chain aliphatic diisocyanates such as 1,6-hexamethylene diisocyanate, 1,12-dodecane diisocyanate, 3-methyl-1,5-pentane diisocyanate, and trimethyl-hexamethylene diisocyanate; and alicyclic diisocyanates having an alicyclic structure such as cyclohexane diisocyanate, dicyclohexylmethane diisocyanate, isophorone diisocyanate, hydrogenated xylylene diisocyanate, and norbornane diisocyanate. In addition, isocyanate group-terminated compounds obtained by a reaction between these isocyanates and active hydrogen group-containing compounds, polyisocyanate modification products by an reaction of these compounds themselves, such as a uretodionization reaction, an isocyanuration reaction, or a carbodiimidation reaction, or the like can be used.

Among these isocyanates, from the viewpoint of improving toughness and flexibility, 1,6-hexamethylene diisocyanate is preferred.

<<Chain Extender (A2)>>

Examples of the chain extender (A2) include low molecular diols and bifunctional low molecular glycol ethers.

Examples of the low molecular diols include one kind or a mixture of two or more kinds of ethylene glycol, 1,2-propanediol, 1,3-propanediol, 1,2-butanediol, 1,3-butanediol, 1,4-butanediol, 1,5-pentanediol, 1,6-hexanediol, diethylene glycol, dipropylene glycol, neopentyl glycol, 3-methyl-1,5-pentanediol, 2,2-diethyl-1,3-propanediol, 2-n-butyl-2-ethyl-1,3-propanediol, 2,2,4-trimethyl-1,3-pentanediol, 2-ethyl-1,3-hexanediol, 1,4-cyclohexane dimethanol, 1,4-bis(2-hydroxyethoxy)benzene, and the like.

Further, within a range that the properties of the thermoplastic resin are not impaired, an active hydrogen compound having the number of functional groups of one such as 1-decanol, 1-dodecanol, stearyl alcohol, 1-docosanol, diethylene glycol monomethyl ether, diethylene glycol monobutyl ether, diethylene glycol monohexyl ether, or triethylene glycol monomethyl ether, or an active hydrogen compound having the number of functional groups of more than two such as glycerin, trimethylolpropane, pentaerythritol, diglycerin, or sorbitol can also be used in combination.

Examples of the bifunctional low molecular glycol ethers include glycol ethers such as 2,2-bis(4-polyoxyethylene-oxyphenyl)propane, 2,2-bis(4-polyoxypropylene-oxyphenyl)propane, dimethylolheptane ethylene oxide adduct, and dimethylolheptane propylene oxide adduct. Further, one kind or two or more kinds thereof can be used in combination.

The number average molecular weight of the chain extender (A2) is preferably greater than or equal to 60 and less than or equal to 300 for the purpose of utilizing softness and flexibility that are the innate properties of the thermoplastic resin.

In a case where the number average molecular weight of the chain extender (A2) is less than 60, since the concentration of the urethane group of the "IPU (A) becomes relatively too high, an unmelted matter may be generated or the viscosity of a melted matter of the TPU (A) may increase, so that a defect in molding at the time of processing may occur, which results in a defect in appearance. Further, in a case where the number average molecular weight is less than 60, hardness, 100% modulus, tensile strength, and tear strength increase, but elongation decreases, so that softness and flexibility that are the innate properties of the thermoplastic resin may be difficult to utilize.

On the other hand, when the number average molecular weight of the chain extender is more than 300, since the concentration of the urethane group becomes relatively too low, desired physical properties are not obtainable in some cases. Therefore, the molded article of the resin composition obtained by using this thermoplastic polyurethane resin may be insufficient in mechanical characteristics. Among these, the chain extender (A2) is preferably at least one selected from the group consisting of 1,4-butanediol and 1,6-hexanediol.

<<Polyol Component (A3)>>

The polyol component (A3) contains a polycarbonate diol having a side-chain alkyl group.

The polycarbonate diol having a side-chain alkyl group means a polycarbonate diol having two hydroxyl groups which can react with an isocyanate group in the molecule, wherein the polycarbonate diol has an alkylene residue having a side-chain alkyl group, possibly, further has a straight-chain alkylene residue.

Herein, the residue in the present disclosure refers to a structure portion excluding a functional group such as a hydroxyl group and a carbonate bond in each compound. For example, a structure portion excluding a hydroxyl group of a straight-chain diol such as 1,6-hexanediol refers to a straight-chain alkylene residue, and a structure portion excluding a hydroxyl group of a diol having a side-chain alkyl group such as 3-methyl-1,5-pentanediol refers to an alkylene residue having a side-chain alkyl group.

The polycarbonate diol having a side-chain alkyl group can be obtained by dealcohol reaction, dephenol reaction, or the like of diols including a diol having an alkyl group at a side chain with dimethyl carbonate, diethyl carbonate, diphenyl carbonate, diethylene carbonate, or the like.

Examples of the diol having an alkyl group at a side chain include 2-methyl-1,3-propanediol, neopentyl glycol, 3-methyl-1,5-pentanediol, and 2-ethyl-1,3-hexanediol.

Further, in the diols having an alkyl group at a side chain, a straight-chain diol can also be used in combination.

Examples of the straight-chain diol include ethylene glycol, 1,3-propanediol, 1,4-butanediol, 1,5-pentanediol, 1,6-hexanediol, 1,9-nonanediol, and 1,4-cyclohexane dimethanol.

The number average molecular weight of the polycarbonate diol having a side-chain alkyl group contained in the polyol component (A3) is preferably greater than or equal to 750 and less than or equal to 3000, more preferably greater than or equal to 800 and less than or equal to 2000, and further preferably greater than or equal to 1000 and less than or equal to 2000.

When the number average molecular weight is greater than or equal to 750 and less than or equal to 3000, moldability at the time of processing of the thermoplastic polyurethane resin is improved, and mechanical characteristics and transparency of the molded article of the resin composition can be further improved.

Incidentally, the number average molecular weight of the polycarbonate diol having a side-chain alkyl group can be measured according to J15 K 7252-3 (Plastics-Determination of average molecular mass and molecular mass distribution of polymers using size-exclusion chromatography— Part 3: Low-temperature method).

<<<Molar Ratio α>>>

The polycarbonate diol having a side-chain alkyl group contained in the polyol component (A3) preferably has a straight-chain alkylene residue and an alkylene residue having a side-chain alkyl group.

The molar ratio α of the straight-chain alkylene residue and the alkylene residue having a side-chain alkyl group in the polycarbonate diol having a side-chain alkyl group can be arbitrarily set, but is preferably greater than or equal to 0/10 and less than or equal to 6/4 and further preferably greater than or equal to 1/9 and less than or equal to 6/4.

When the polycarbonate diol having a side-chain alkyl group contains a side-chain alkyl group in the molecule, the polycarbonate diol improves compatibility with the ultraviolet absorber (B), the hindered amine light stabilizer (C), the antioxidant (D), or cyclic oligourethane that is a side product, so that appearance deterioration due to blooming is suppressed. In addition, the crystalline growth of soft segments is suppressed by the polycarbonate diol having a side-chain alkyl group, so that scattering of light is suppressed to improve transparency. Furthermore, when the polycarbonate dial has a straight-chain alkylene residue, both abrasion resistance and permanent elongation can be achieved.

In the polyol component (A3), a polycarbonate diol having a side-chain alkyl group which has been prepared in advance and a polycarbonate diol only having a straight-chain alkylene residue may be blended at an arbitrary ratio and then used.

Further, within a range that the gist of the present disclosure is not impaired, along with diols having an alkyl group at the side chain, polylactone diols, polyether diols, or polyester diols may be used in combination.

<<<R' Value: Number of Moles of Active Hydrogen Group of Chain Extender (A2)/Number of Moles of Active Hydrogen Group of Polyol Component (A3)>>>

Regarding the blending ratio of the chain extender (A2) and the polyol component (A3), a ratio of the number of moles of the active hydrogen group of the chain extender (A2) to the number of moles of the active hydrogen group of the polyol component (A3) ([the number of moles of the active hydrogen group of the chain extender (A2)]/[the number of moles of the active hydrogen group of the polyol component (A3)]=value) is an index of the hard segment amount of the TPU (A) and influences expression of physical properties. From such a viewpoint, the R' value is preferably greater than or equal to 0.1 and less than or equal to 15 and more preferably greater than or equal to 0.3 and less than or equal to 12.

<<<R Value: Number of Moles of Whole Isocyanate Group/Number of Moles of Whole Active Hydrogen Group>>>

A ratio of the number of moles of the whole isocyanate group to the number of moles of the whole active hydrogen group, that is, the total of the number of moles of the active hydrogen group of the chain extender (A2) and the number of moles of the active hydrogen group of the polyol component (A3), ([the number of moles of the whole isocyanate group]/[the number of moles of the whole active hydrogen group]=R value) is, from the viewpoint of adjusting the molecular weight or the viscosity of the TPU (A) to a preferable range, preferably greater than or equal to 0.7 and less than or equal to 1.3 and more preferably greater than or equal to 0.8 and less than or equal to 1.2.

<Ultraviolet Absorber (B)>

The ultraviolet absorber (B) contains an ultraviolet absorber (B1) having a benzotria7ole skeleton and an ultraviolet absorber (B2) having a triazine skeleton.

<<Ultraviolet Absorber (B1) Having Benzotriazole Skeleton>>

As the ultraviolet absorber (B1) having a benzotriazole skeleton, a known benzotriazole-based ultraviolet absorber can be used. Representative examples thereof include Tinuvin-328: 2-(2H-1,2,3-benzotriazole-2-yl)-4,6-di-Cert-pentylphenol (manufactured by BASF), JF-83: 2-[2-hydroxy-5-(1,1,3,3-tetramethylbutyl)phenyl]benzotriazole (manufactured by JOHOKU CHEMICAL CO., LTD.), and Tinuvin-326: 2-(2'-hydroxy-3'-t-butyl-5'-methylphenyl)-5-chlorobenzotriazole (manufactured by BASF).

<<Ultraviolet Absorber (B2) Having Triazine Skeleton>>

The ultraviolet absorber (B2) having a triazine skeleton has a maximum absorption wavelength in a range from greater than or equal to 250 nm to less than or equal to 290 nm.

As the ultraviolet absorber (B2) having a triazine skeleton, of known triazine-based ultraviolet absorbers, those having a maximum absorption wavelength in a range from greater than or equal to 250 nm to less than or equal to 290 nm can be used. Representative examples thereof include ADK STAB LA-46: 2-ethylhexanoate=2-[3-hydroxy-4-(4,6-diphenyl-1,3,5-triazine-2-yl)phenoxy]ethyl (manufactured by ADEKA CORPORATION) and Tinuvin-1577: 2-(4,6-diphenyl-1,3,5-triazine-2-yl)-5-(hexyloxy)phenol (manufactured by BASF).

The mass ratio (B1)/(B2) of the ultraviolet absorber (B1) having a benzotriazole skeleton to the ultraviolet absorber (B2) having a triazine skeleton is greater than or equal to 2.5/1 and less than or equal to 10/1.

In a case where the mass ratio (B1)/(B2) is out of the range from 2.5/1 to 10/1, uniform ultraviolet light absorption cannot be achieved, and a wavelength range in which absorption is weak is generated.

The sum of the content of the ultraviolet absorber (B1) having a benzotriazole skeleton and the content of the ultraviolet absorber (B2) having a triazine skeleton is greater than or equal to 0.6 part by mass and less than or equal to 1.2 parts and more preferably greater than or equal to 0.7 part by mass and less than or equal to 1.0 part by mass with respect to 100 parts by mass of the thermoplastic polyurethane resin (A).

In a case where the sum of the content of the ultraviolet absorber (B1) having a benzotriazole skeleton and the content of the ultraviolet absorber (B2) having a triazine skeleton is less than 0.6 part by mass, ultraviolet absorbing capability is not sufficient. Further, in a case where the sum is more than 1.2 parts by mass, ultraviolet absorbing capability can be sufficiently ensured, but a problem of a defect in appearance of the molded article due to coloration or blooming arises.

<<Hindered Amine Light Stabilizer (C)>>

As the hindered amine light stabilizer (HALS) (C), a conventionally known stabilizer can be used. Representative examples thereof include Chimassorb-944: poly[ {641,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}](manufactured by BASF), Tinuvin-622: dimethyl succinate 1-(2-hydroxyethyl)-4-hydroxy-2,2,6,6-tetramethylpiperidine polycondensation (manufactured by BASF), Tinuvin-770: bis(2,2,6,6-tetramethylpiperidine-4-yl}=decanedioate (manufactured by BASF), and Tinuvin-765: bis(1,2,2,6,6-pentamethyl-4-piperidyl)=decanedioate (manufactured by BASF). These may be used singly or in combination of two or more kinds thereof.

The content of the hindered amine light stabilizer (C) is greater than or equal to 0.2 part by mass and less than or equal to 2.0 parts by mass with respect to 100 parts by mass of the thermoplastic polyurethane resin (A). In a case where the content of the hindered amine light stabilizer (C) is less than 0.2 part by mass, sufficient stability with respect to ultraviolet light is not obtainable. In a case where the content of the hindered amine light stabilizer (C) is more than 2.0 parts by mass, a problem of a defect in appearance of the molded article due to bleeding or blooming arises.

<<Antioxidant (D)>>

As the antioxidant (D), a conventionally known antioxidant can be used. Representative examples thereof include IRGANOX-1010: pentaerythritol=tetrakis[343',5'-di-cert-butyl-4'-hydroxyphenyl)propionate] (manufactured by BASF) and SUMILIZER GA-80: 2,2'-dimethyl-2,2'-(2,4,8,10-tetraoxaspiro [5.5]undecane-3,9-diyl)dipropane-1,1'-diyl=bis [3-(3-tert-butyl-4-hydroxy-5-methylphenyl)propanoate] (manufactured by Sumitomo Chemical Co., Ltd.).

The content of the antioxidant (D) is greater than or equal to 0.05 part by mass and less than or equal to 1.0 part by mass with respect to 100 parts by mass of the thermoplastic polyurethane resin (A). In a case where the content of the antioxidant (D) is less than 0.05 part by mass, oxidation preventing capability is not sufficient. In a case where the content of the antioxidant (D) is more than 1.0 part by mass, a problem of a defect in appearance of the molded article due to blooming arises.

<Other Additives>

To the thermoplastic polyurethane resin composition, other than the aforementioned components, as necessary, various additives, such as a thermal stabilizer, an antioxidant, an ultraviolet absorber, a flame retardant, a hydrolysis inhibitor, a heat resistance improver, a weather resistance improver, a reactive retardant, a lubricant, a plasticizer, an antistatic agent, a conductivity imparting agent, an antibacterial agent, an antifungus agent, a colorant, inorganic and organic fillers, a fiber reinforcing filler, and a crystal nucleating agent, which are usually used in production of a thermoplastic polyurethane resin can also be arbitrarily added.

<Ultraviolet Transmittance>

Since the thermoplastic polyurethane resin composition contains the ultraviolet absorber (B) and the hindered amine light stabilizer (C) at the composition described above, in a case where a film having a thickness of 0.15 mm is prepared, the film exhibits the maximum value of ultraviolet transmittance in a wavelength range from greater than or equal to 200 nm to less than or equal to 315 nm is less than 5% and the maximum value of ultraviolet transmittance in a wavelength range from greater than 315 nm to less than or equal to 350 nm is less than 1%.

<Method for Producing Thermoplastic Polyurethane Resin Composition>

The thermoplastic polyurethane resin composition can be prepared in such a manner that the TPU (A), the ultraviolet absorber (B), the hindered amine light stabilizer (C), and the antioxidant (D), which have been blended at an appropriate ratio, are mixed with a kneader, Henschel mixer, or the like and then supplied to an extruder, the resultant mixture is melted and kneaded at a temperature at which a general TPU is extruded (about 150 to 220° C.) and then formed into a pellet shape by strand cutting or underwater cutting.

Further, the thermoplastic polyurethane resin composition can also be prepared in such a manner that the ultraviolet absorber (B), the hindered amine light stabilizer (C), and the antioxidant (D) are blended with a raw material used when the TPU (A) is produced, for example, the polyol component (A3) or the isocyanate component (A1) and uniformly mixed, and then the resultant mixture is subjected to a reaction.

The method of adding the ultraviolet absorber (B), the hindered amine light stabilizer (C), and the antioxidant (D) includes a method of directly adding the respective components to the TPU (A) in the amounts described above. As other adding method, a method in which a high-concentration master batch is prepared in advance and the master batch is mixed with the TPU (A) in a desired amount in terms of concentration can also be used.

The TPU (A) constituting the thermoplastic polyurethane resin composition can be obtained by a known method for producing a thermoplastic polyurethane resin, such as a one-shot method, a prepolymer method, a batch reaction method, a continuous reaction method, a method using a kneader, or a method using an extruder.

Further, the thermoplastic polyurethane resin composition is independently obtained as shapes such as flake, pellet, powder, granule, rod, sheet, and block by the above-described production method.

Furthermore, the powder-shaped or block-shaped solid matter obtained as described above is pulverized to obtain flake-shaped matter, the matter is supplied to an extruder and melted and kneaded at a temperature at which a general thermoplastic polyurethane resin is extruded (about 150° C. or higher and 220° C. or lower), and then a pellet-shaped matter can be obtained by strand cutting or underwater cutting. Further, in the method using a kneader, the polyol component (A3), the chain extender (A2), the ultraviolet absorber (B), the hindered amine light stabilizer (C), and the antioxidant (D) are charged into a kneader and heated to 100° C. under stirring, the isocyanate (A1) is then charged, and the resultant product is subjected to a reaction for 10 minutes to 120 minutes and cooled, so that a powder-shaped or block-shaped TPU can be produced. Incidentally, in those methods, as necessary, a catalyst or an additive can be added.

Examples of the catalyst at the time of producing the TPU (A) include amines such as triethylamine, triethylenediamine, N-methylimidazole, N-ethylmorpholine, and 1,8-diazabicyclo[5,4,0]-7-undecene (DBU; diazabicyclo undecene); organic metals such as potassium acetate, stannous octoate, dibutyltin dilaurate, dioctyltin dilaurate, dibutyltin diacetate, titanate ester, a zirconium compound, a bismuth compound, and an iron compound; and phosphorus compounds such as tributylphosphine, phospholene, and phospholene oxide. Incidentally, these compounds can be respectively used singly or used in combination of two or more kinds thereof.

Among these, organic metals, particularly, titanate ester, iron, tin, zirconium, and a bismuth compound are preferred. The total amount of catalysts to be used is preferably less than or equal to 5% by mass and more preferably greater than or equal to 0.001% by mass and less than or equal to 2% by mass with respect to the TPU (A).

As the method for molding a thermoplastic polyurethane resin composition, a method for molding a TPU which is generally used can be applied, and for example, molding methods such as extrusion molding, injection molding, inflation molding, blow molding, vacuum molding, centrifugal molding, rotational molding, calendar processing, roll processing, and press processing can be used.

[Molded Body]

The aforementioned thermoplastic polyurethane resin composition can be suitable used as various molded bodies. Therefore, a molded body according to an embodiment of the present invention is formed by the aforementioned thermoplastic polyurethane resin composition.

Examples of the molded body may include interior and exterior materials of houses, communication cables, industrial cables, interior and exterior materials of automobiles and various vehicles, home electrical appliances, decorative components, windmill for wind-power generation, and protection films. These can be used in a wide range of areas indoors and outdoors.

(1): A thermoplastic polyurethane resin composition according to a first embodiment of the present invention is a thermoplastic polyurethane resin composition containing:
a thermoplastic polyurethane resin (A);
an ultraviolet absorber (B);
a hindered amine light stabilizer (C); and
an antioxidant (D), in which the thermoplastic polyurethane resin (A) is a reaction product of
an isocyanate component (A1) containing an aliphatic polyisocyanate, a chain extender (A2), and a polyol component (A3) containing a polycarbonate diol having a side-chain alkyl group,
the ultraviolet absorber (B) contains
an ultraviolet absorber (B1) having a benzotriazole skeleton, and an ultraviolet absorber (B2) having a triazine skeleton,
the ultraviolet absorber (B2) having a triazine skeleton has a maximum absorption wavelength in a range from greater than or equal to 250 nm to less than or equal to 290 nm,
a mass ratio (B1)/(B2) of the ultraviolet absorber (B1) having a benzotriazole skeleton to the ultraviolet absorber (B2) having a triazine skeleton is greater than or equal to 2.5/1 and less than or equal to 10/1,
the sum of a content of the ultraviolet absorber (B1) having a benzotriazole skeleton and a content of the ultraviolet absorber (B2) having a triazine skeleton is greater than or equal to 0.6 part by mass and less than or equal to 1.2 parts by mass with respect to 100 parts by mass of the thermoplastic polyurethane resin (A),
a content of the hindered amine light stabilizer (C) is greater than or equal to 0.2 part by mass and less than or equal to 2.0 parts by mass with respect to 100 parts by mass of the thermoplastic polyurethane resin (A), and
a content of the antioxidant (D) is greater than or equal to 0.05 part by mass and less than or equal to 1.0 part by mass with respect to 100 parts by mass of the thermoplastic polyurethane resin (A).

(2): A thermoplastic polyurethane resin composition according to a second embodiment of the present invention is the thermoplastic polyurethane resin composition described in the first embodiment, in which
the aliphatic polyisocyanate contained in the isocyanate component (A1) is 1,6-hexamethylene diisocyanate.

(3): A thermoplastic polyurethane resin composition according to a third embodiment of the present invention is the thermoplastic polyurethane resin composition described in the first or second embodiment, in which
the chain extender (A2) is at least one selected from the group consisting of 1,4-butanediol and 1,6-hexanediol.

(4): A thermoplastic polyurethane resin composition according to a fourth embodiment is the thermoplastic polyurethane resin composition described in any one of the first to third embodiments, in which
the polycarbonate diol having a side-chain alkyl group contained in the polyol component (A3) has
a number average molecular weight from greater than or equal to 750 to less than or equal to 3000, and
a straight-chain alkylene residue and an alkylene residue having a side-chain alkyl group, and
a molar ratio $\alpha$ of the straight-chain alkylene residue to the alkylene residue having a side-chain alkyl group is greater than or equal to 0/10 and less than or equal to 6/4.

(5): A thermoplastic polyurethane resin composition according to a fifth embodiment is the thermoplastic polyurethane resin composition described in the fourth embodiment, in which
the molar ratio $\alpha$ is greater than or equal to 1/9 and less than or equal to 6/4.

(6): A thermoplastic polyurethane resin composition according to a sixth embodiment is the thermoplastic polyurethane resin composition described in any one of the first to fifth embodiments, in which in a case where a film having a thickness of 0.15 mm is formed, the film exhibits a maximum value of an ultraviolet transmittance in a wavelength range from greater than or equal to 200 nm to less than or equal to 315 nm is less than 5%, and a maximum value of an ultraviolet transmittance in a wavelength range from greater than 315 nm to less than or equal to 350 nm is less than 1%.

(7): A molded body according to a seventh embodiment is a molded body being formed by the thermoplastic polyurethane resin composition described in any one of the first to sixth embodiments.

With the thermoplastic polyurethane resin composition according to an embodiment of the present invention, the ultraviolet absorbing capability in a wide wavelength range of the thermoplastic polyurethane resin is improved, and further, favorable mechanical characteristics, hydrolysis resistance, appearance, and blooming resistance are achieved, so that the thermoplastic polyurethane resin composition having ultraviolet absorbing capability and hydrolysis resistance as the whole composition can be obtained. In addition, with the composition according to an embodiment of the present invention, a molded body using the thermoplastic polyurethane resin composition can be obtained. Furthermore, by this molded body of the thermoplastic polyurethane resin composition being equipped to a surface of an article to be used outdoors, the article can be protected from ultraviolet light for a long period of time.

EXAMPLES

The present invention will be described in more detail by means of Examples and Comparative Examples; however, the present invention is not limited thereto.

Examples 1 to 8 and Comparative Examples 1 to 7

Preparation of Samples

Into a reaction container equipped with a stirrer and a thermometer, the polyol component (A3), the chain extender (A2), the ultraviolet absorber (B), the HALS (C), and the antioxidant (D) were charged in amounts described in Table 1 and Table 2, and uniformly mixed to obtain a mixed solution.

After the obtained mixed solution was heated to 100° C., the isocyanate component (A1) was added thereto in amounts described in Table 1 and Table 2 to perform a urethanization reaction. The reaction product was poured on a tray when the reaction product reached 90° C., followed by solidification to obtain a solid matter. The solid matter was aged for 16 hours in an electric furnace set at 80° C. and cooled to room temperature, and then the solid matter was pulverized to obtain a flake-shaped TPU.

The obtained flake-shaped TPU was pelletized by an extruder, and the obtained pellet was subjected to T-die extrusion molding or injection molding at from 180° C. to 220° C., thereby producing a film having a thickness of 0.15 mm (extrusion molding) and a sheet having a thickness of 2 mm (injection molding) to use the film and the sheet as samples of Examples 1 to 8 and Comparative Examples 1 to 7.

TABLE 1

| | Items | Example 1 | Example 2 | Example 3 | Example 4 | Example 5 | Example 6 | Example 7 | Example 8 |
|---|---|---|---|---|---|---|---|---|---|
| A1 | HDI | 291 | 188 | 288 | 251 | 219 | 219 | 219 | 219 |
| A2 | 1,4-BG | 102 | 55 | — | 106 | 51 | 51 | 51 | 51 |
| | 1,6-HG | — | — | 136 | — | — | — | — | — |
| A3 | PCD (HG/MPD = 0/10)-1000 | 607 | — | 575 | — | — | — | — | — |
| | PCD (HG/MPD = 0/10)-1500 | — | 757 | — | — | — | — | — | — |
| | PCD (HG/MPD = 5/5)-2000 | — | — | — | 643 | — | — | — | — |
| | PCD (HG/MPD = 1/9)-1000 | — | — | — | — | 657 | 584 | 511 | 365 |
| | PCD (HG/MPD = 10/0)-1000 | — | — | — | — | 73 | 146 | 219 | 365 |
| | PCD (HG/MPD = 10/0)-2000 | — | — | — | — | — | — | — | — |
| | PTG-1000 | — | — | — | — | — | — | — | — |
| B1 | Tinuvin-328 | 5 | 5 | 5 | 5 | 5 | 5 | 5 | 5 |
| B2 | ADK STAB LA-46 | 2 | 2 | 2 | 2 | 2 | 2 | 2 | 2 |
| | ADK STAB LA-F70 | — | — | — | — | — | — | — | — |
| C | Tinuvin-622LD | 4 | 4 | 4 | 4 | 4 | 4 | 4 | 4 |
| D | SUMILIZER GA-80 | 1 | 1 | 1 | 1 | 1 | 1 | 1 | 1 |
| Molar ratio of straight-chain alkylene residue to alkylene residue having side-chain alkyl group in A3 | | 0/100 | 0/100 | 0/100 | 50/50 | 9/81 | 28/72 | 37/63 | 55/45 |
| Hardness | JIS-A | 95 | 85 | 95 | 95 | 90 | 90 | 90 | 90 |
| 100% modulus | MPa | 9 | 5 | 9 | 9 | 5 | 5 | 5 | 5 |
| Tensile strength | MPa | 56 | 39 | 61 | 71 | 55 | 55 | 56 | 57 |
| Elongation | % | 660 | 860 | 700 | 580 | 700 | 700 | 660 | 650 |
| Tear strength | kN/m | 104 | 77 | 95 | 97 | 75 | 75 | 77 | 80 |
| Taber abrasion amount | mg | 79 | 110 | 92 | 72 | 48 | 45 | 44 | 40 |
| Permanent elongation | % | 27 | 18 | 24 | 16 | 16 | 16 | 16 | 16 |
| Hydrolysis resistance | Determination | A | A | A | A | A | A | A | A |
| Ultraviolet transmittance | Maximum value (%, 200 nm or more and 315 nm or less) | 0.7 | 0.7 | 0.8 | 0.7 | 0.7 | 0.7 | 0.8 | 0.7 |

TABLE 1-continued

| | Items | Example 1 | Example 2 | Example 3 | Example 4 | Example 5 | Example 6 | Example 7 | Example 8 |
|---|---|---|---|---|---|---|---|---|---|
| | Maximum value (%, more than 315 nm and 350 nm or less) | 0.0 | 0.0 | 0.0 | 0.0 | 0.0 | 0.0 | 0.0 | 0.0 |
| | Determination | A | A | A | A | A | A | A | A |
| Weather resistance 1 | Determination | A | A | A | A | A | A | A | A |
| Weather resistance 2 | Determination | A | A | A | A | A | A | A | A |
| Transparency | Determination | A | A | A | A | A | A | A | A |
| Blooming resistance | Determination | A | A | A | A | A | A | A | A |

TABLE 2

| | Items | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| A1 | HDI | 291 | 291 | 291 | 291 | 178 | 270 | 219 |
| A2 | 1,4-BG | 102 | 102 | 102 | 102 | 61 | 87 | 51 |
| | 1,6-HG | — | — | — | — | — | — | — |
| A3 | PCD (HG/MPD = 0/10)-1000 | 607 | 607 | 607 | 607 | — | — | — |
| | PCD (HG/MPD = 0/10)-1500 | — | — | — | — | — | — | — |
| | PCD (HG/MPD = 5/5)-2000 | — | — | — | — | — | — | — |
| | PCD (HG/MPD = 1/9)-1000 | — | — | — | — | — | — | — |
| | PCD (HG/MPD = 10/0)-1000 | — | — | — | — | — | — | 730 |
| | PCD (HG/MPD = 10/0)-2000 | — | — | — | — | 761 | — | — |
| | PTG-1000 | — | — | — | — | — | 643 | — |
| B1 | Tinuvin-328 | 7 | — | 4 | 5 | 5 | 5 | 5 |
| B2 | ADK STAB LA-46 | — | 2 | 1 | — | 2 | 2 | 2 |
| | ADK STAB LA-F70 | — | — | — | 2 | — | — | — |
| C | Tinuvin-622LD | 4 | 4 | 4 | 4 | 4 | 4 | 4 |
| D | SUMILIZER GA-80 | 1 | 1 | 1 | 1 | 1 | 1 | 1 |
| | Molar ratio of straight-chain alkylene residue to alkylene residue having 1 or more carbon atoms and having side-chain alkyl group in A3 | 0/100 | 0/100 | 0/100 | 0/100 | 100/0 | 0/0 | 100/0 |
| Hardness | JIS-A | 95 | 95 | 95 | 95 | 85 | 85 | 99 |
| 100% modulate | MPa | 9 | 9 | 9 | 9 | 5 | 8 | 5 |
| Tensile strength | MPa | 56 | 55 | 55 | 55 | 40 | 58 | 60 |
| Elongation | % | 660 | 660 | 660 | 660 | 800 | 900 | 650 |
| Tear strength | kN/m | 103 | 103 | 105 | 105 | 80 | 86 | 92 |
| Taber abrasion amount | mg | 79 | 79 | 79 | 79 | 60 | 150 | 38 |
| Permanent elongation | % | 27 | 27 | 27 | 27 | 20 | 25 | 24 |
| Hydrolysis resistance | Determination | A | A | A | A | A | A | A |
| Ultraviolet transmittance | Maximum value (%, 200 nm or more and 315 nm or less) | 24.5 | 11.7 | 7.2 | 26.4 | 0.7 | 0.7 | 0.7 |
| | Maximum value (%, more than 315 nm and 350 not or less) | 0.0 | 11.7 | 0.5 | 0.0 | 0.0 | 0.0 | 0.0 |
| | Determination | B | B | B | B | A | A | A |
| Weather resistance 1 | Determination | A | A | A | A | A | A | A |
| Weather resistance 2 | Determination | B | B | B | B | A | A | A |
| Transparency | Determination | A | A | A | A | B | B | B |
| Blooming resistance | Determination | A | A | A | A | B | B | B |

Further, raw materials used in Table 1 and Table 2 are as follows.

<Isocyanate Component>
HDI: 1,6-hexamethylene diisocyanate, manufactured by Tosoh Corporation <Chain Extender>
1,4-BG: 1,4-butanediol (number average molecular weight=90), manufactured by Mitsubishi Chemical Corporation
1,6-HG: 1,6-hexanediol (number average molecular weight=118) manufactured by Mitsubishi Chemical Corporation <Polycarbonate Diol Containing Alkylene Residue Having Side-Chain Alkyl Group>
PCD (HG/MPD=0/10)-1000: poly 3-methyl-1,5-pentane carbonate diol (number average molecular weight=1000), manufactured by Tosoh Corporation
PCD (HG/MPD=0/10)-1500: poly 3-methyl-1,5-pentane carbonate diol (number average molecular weight=1500), manufactured by Tosoh Corporation
PCD (HG/MPD=5/5)-2000: polycarbonate diol in which the molar ratio of hexamethylene residue and 3-methyl-pentamethylene residue is 5/5 (number average molecular weight=2000), manufactured by Tosoh Corporation PCD (HG/MPD=1/9)-1000: polycarbonate diol in which the molar ratio of hexamethylene residue and 3-methyl-pentamethylene residue is 1/9 (number average molecular weight=1000), manufactured by Tosoh Corporation <Polycarbonate Diol Not Containing Alkylene Residue Having Side-Chain Alkyl Group>

PCD (HG/MPD=10/0)-1000: polyhexamethylene carbonate diol (number average molecular weight=1000), manufactured by Tosoh Corporation PCD (HG/MPD=10/0)-2000: polyhexamethylene carbonate diol (number average molecular weight=2000), manufactured by Tosoh Corporation <Polytetramethylene Ether Glycol>

PTG-1000: polytetramethylene ether glycol (number average molecular weight=1000), manufactured by Mitsubishi Chemical Corporation <Ultraviolet Absorber (Benzotriazole-Based)>

Tinuvin-328: manufactured by BASF

<Ultraviolet Absorber (Triazine-Based)>

ADK STAB LA-46: ultraviolet absorber having a triazine skeleton and having a maximum absorption wavelength in a range from greater than or equal to 250 nm to less than or equal to 290 nm, manufactured by ADEKA CORPORATION ADK STAB LA-F70: ultraviolet absorber having a triazine skeleton and not having a maximum absorption wavelength in a range from greater than or equal to 250 nm to less than or equal to 290 nm, manufactured by ADEKA CORPORATION

<HALS>

Tinuvin-622LD: manufactured by BASF

<Antioxidant>

SUMILIZER GA-80: manufactured by Sumitomo Chemical Co., Ltd.

(Property Test)

Regarding T-die extrusion molded films or injection molded sheets as molded articles produced by the above-described procedures, various properties described below were evaluated. The obtained results are presented in Table 1 and Table 2.

(1) Physical Properties (Mechanical Properties)

Measurement was conducted using the T-die extrusion molded films according to the measurement methods described in MS K 7311 (Testing methods for thermoplastic polyurethane elastomers). Incidentally, the injection molded sheets were used in hardness measurement and Taber abrasion amount measurement.

[Hardness (JIS-A Hardness)]

It can be said that 56 or more is sufficient.

[100% Modulus (Tensile Stress, MPa)]

It can be said that 3.0 MPa or more is sufficient.

[Tensile Strength (MPa)]

It can be said that 12 MPa or more is sufficient.

[Elongation (%)]

It can be said that 400% or more is sufficient.

[Tear Strength (kN/m)]

It can be said that 60 kN/m or more is sufficient.

[Taber Abrasion Amount (mg)]

It can be said that 130 mg or less is sufficient and 50 mg or less is favorable.

(2) Permanent Elongation

The T-die extrusion molded film (thickness of 0.15 mm) was used and punched into a dumbbell shape (No. 1) defined in JIS K7312 (Physical testing methods for molded products of thermosetting polyurethane elastomers), and marked lines with an interval of 40 mm were provided to obtain a test piece. The intervals of the marked lines were stretched to 150% using a tensile tester (UTA-500, manufactured by ORIENTEC CORPORATION) and held for 10 minutes. The test piece was detached from the tester, a distance between the marked lines after 10 minutes was measured, and then the permanent elongation (%)=(a distance mm between the marked lines after 10 minutes from the test piece being detached from the tester−40 mm)/40 mm×100 was calculated. In can be said that the permanent elongation of 30% or less is sufficient and the permanent elongation of 20% or less is favorable.

(3) Hydrolysis Resistance

The T-die extrusion molded film (thickness of 0.15 mm) was used and punched into a dumbbell shape (No. 3) defined in JIS K7311 (Testing methods for thermoplastic polyurethane elastomers) to obtain a test piece. The test piece was immersed in warm water set at 95° C. for 14 days, and the tensile strength was measured using a tensile tester (UTA-500, manufactured by ORIENTEC CORPORATION). The result was compared with the film physical property (tensile strength) before the test and evaluated by the retention rate thereof on the basis of the following criteria, the case of a retention rate of 80% or more was designated as A, and the case of a retention rate of less than 80% was designated as B.

(4) Ultraviolet Transmittance (Article Protective Performance from Ultraviolet Light)

The T-die extrusion molded film (thickness of 0.15 mm) was used as a test piece, an air layer was used as a blank, and the ultraviolet transmittance in 200 nm. to 400 nm was measured. A case where the maximum value of ultraviolet transmittance in a wavelength range from greater than or equal to 200 nm to less than or equal to 315 nm is less than 5% and the maximum value of ultraviolet transmittance in a wavelength range from greater than 315 nm to less than or equal to 350 nm is less than 1% was designated as A and a case where the maximum value of ultraviolet transmittance is out of above ranges was designated as B. The ultraviolet transmittance was measured using a spectrophotometer (UV-2500PC, manufactured by SHIMADZU CORPORATION).

(5) Weather Resistance 1 (Weathering Performance of Resin Composition Itself)

The T-die extrusion molded film (thickness of 0.15 mm) was used as a test piece, the test piece was exposed to the artificial outdoors until an accumulative irradiance of 1000 MJ/m$^2$ (including 24-minute rainfall condition of 360-minute cycle) using a tester having a xenon arc lamp as a light source (Super Xenon Weather Meter SX75, manufactured by Suga Test Instruments Co., Ltd.), and then the tensile strength was measured using a tensile tester (UTA-500, manufactured by ORIENTEC CORPORATION). The tensile strength was compared with the film physical property (tensile strength) before the test, the case of a retention rate of 70% or more was designated as A, and the case of a retention rate of less than 70% was designated as B.

(6) Weather Resistance 2 (Weathering Performance of Resin Composition Itself)

The T-die extrusion molded film (thickness of 0.15 mm) was used as a test piece, the test piece was exposed to the artificial outdoors until an accumulative irradiance of 3000 MJ/m$^2$ (including 24-minute rainfall condition of 360-minute cycle) using a tester having a xenon arc lamp as a light source (Super Xenon Weather Meter SX75, manufactured by Suga Test Instruments Co., Ltd.), and then the tensile strength was measured using a tensile tester (UTA-500, manufactured by ORIENTEC CORPORATION). The tensile strength was compared with the film physical property (tensile strength) before the test, the case of a retention rate of 70% or more was designated as A, and the case of a retention rate of less than 70% was designated as B.

(7) Transparency

The T-die extrusion molded film (thickness of 0.15 mm) was used as a test piece and a haze was measured. The case of a haze of less than 3% was designated as A, and the case of a haze of 3% or more was designated as B. The haze was measured using a haze meter (NDH2000, manufactured by NIPPON DENSHOKU INDUSTRIES CO., LTD.).

(8) Blooming Resistance

The T-die extrusion molded film (thickness of 0.15 mm) was used as a test piece, the test piece was immersed in pure water set at 45° C. for 2 days, and then a change in haze was measured. A case where a change amount of haze ("haze % after the test"–"haze % before the test") is less than 4% was designated as A, and a case where a change amount of haze is 4% or more was designated as B. The haze was measured by the same method as in the transparency evaluation.

The present invention has been described in detail with reference to specific embodiments, and it is obvious for the person skilled in the art that various changes and modifications are possible without departing from the intention and the scope of the present invention.

The entire disclosures of Japanese Patent Application No. 2017-034694 filed on Feb. 27, 2017 and Japanese Patent Application No. 2018-014969 filed on Jan. 31, 2018 including specifications, claims, drawings, and abstracts are incorporated herein by reference in their entireties.

The invention claimed is:

1. A thermoplastic polyurethane resin composition comprising:
   a thermoplastic polyurethane resin (A);
   an ultraviolet absorber (B);
   a hindered amine light stabilizer (C); and
   an antioxidant (D), wherein
   the thermoplastic polyurethane resin (A) is a reaction product of
      an isocyanate component (A1) containing an aliphatic polyisocyanate, a chain extender (A2), and a polyol component (A3) containing a polycarbonate diol having a side-chain alkyl group,
   the ultraviolet absorber (B) contains
      an ultraviolet absorber (B1) having a benzotriazole skeleton, and an ultraviolet absorber (B2) having a triazine skeleton,
   the ultraviolet absorber (B2) having a triazine skeleton has a maximum absorption wavelength in a range from greater than or equal to 250 nm to less than or equal to 290 nm,
   a mass ratio (B1)/(B2) of the ultraviolet absorber (B1) having a benzotriazole skeleton to the ultraviolet absorber (B2) having a triazine skeleton is greater than or equal to 2.5/1 and less than or equal to 10/1,
   the sum of a content of the ultraviolet absorber (B1) having a benzotriazole skeleton and a content of the ultraviolet absorber (B2) having a triazine skeleton is greater than or equal to 0.6 part by mass and less than or equal to 1.2 parts by mass with respect to 100 parts by mass of the thermoplastic polyurethane resin (A),
   a content of the hindered amine light stabilizer (C) is greater than or equal to 0.2 part by mass and less than or equal to 2.0 parts by mass with respect to 100 parts by mass of the thermoplastic polyurethane resin (A), and
   a content of the antioxidant (D) is greater than or equal to 0.05 part by mass and less than or equal to 1.0 part by mass with respect to 100 parts by mass of the thermoplastic polyurethane resin (A).

2. The thermoplastic polyurethane resin composition according to claim 1, wherein the aliphatic polyisocyanate contained in the isocyanate component (A1) is 1,6-hexamethylene diisocyanate.

3. The thermoplastic polyurethane resin composition according to claim 1 or 2 claim 1, wherein the chain extender (A2) is at least one selected from the group consisting of 1,4-butanediol and 1,6-hexanediol.

4. The thermoplastic polyurethane resin composition according to claim 1, wherein
   the polycarbonate diol having a side-chain alkyl group contained in the polyol component (A3) has
      a number average molecular weight from greater than or equal to 750 to less than or equal to 3000, and a straight-chain alkylene residue and an alkylene residue having a side-chain alkyl group, and
   a molar ratio a of the straight-chain alkylene residue to the alkylene residue having a side-chain alkyl group is greater than or equal to 0/10 and less than or equal to 6/4.

5. The thermoplastic polyurethane resin composition according to claim 4, wherein the molar ratio a is greater than or equal to 1/9 and less than or equal to 6/4.

6. The thermoplastic polyurethane resin composition according to claim 1, wherein in a case where a film having a thickness of 0.15 mm is formed, the film exhibits a maximum value of an ultraviolet transmittance in a wavelength range from greater than or equal to 200 nm to less than or equal to 315 nm is less than 5%, and a maximum value of an ultraviolet transmittance in a wavelength range from greater than 315 nm to less than or equal to 350 nm is less than 1%.

7. A molded body being formed by the thermoplastic polyurethane resin composition according to claim 1.

* * * * *